Figure 1:
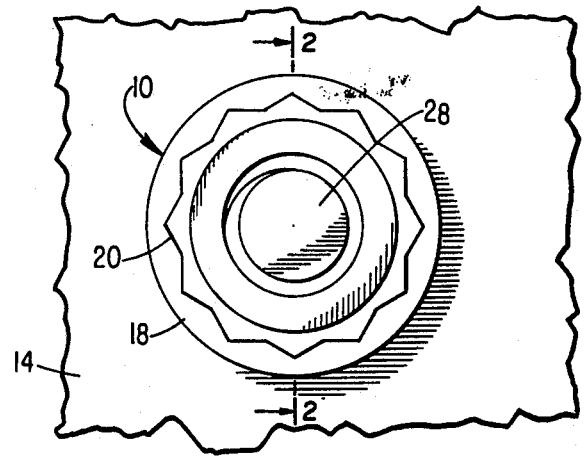

April 5, 1966  S. S. SILWONES  3,244,625
SOLID FILM LUBRICANT
Filed Oct. 15, 1963

INVENTOR.
STEVEN S. SILWONES
BY
Kenneth E. Forman
ATTYS.

United States Patent Office 3,244,625
Patented Apr. 5, 1966

3,244,625
SOLID FILM LUBRICANT
Steven S. Silwones, New Providence, N.J., assignor to Elastic Stop Nut Corporation of America, Union, N.J., a corporation of New Jersey
Filed Oct. 15, 1963, Ser. No. 316,213
14 Claims. (Cl. 252—28)

The present invention relates to lubricants, and particularly to inorganic dry film lubricants for use on metals over a broad temperature range, and to methods of applying such lubricants, and threaded fasteners carrying such lubricants.

The dry film lubricant of the present invention is particularly useful in the lubrication of threaded fasteners such as nuts and bolts and will be so described, although it will be understood that the dry film lubricant is of general utility. Modern technology and particularly high performance aircraft and missiles have placed ever increasing demands upon structural members, one of the principal demands being that these members be operable over a wide temperature range extending from well below 0° F. and up to as high as 2,000° F. or higher, all parts including the nuts and bolts used in assembly being subjected to this wide range of operating temperature. Particular difficulty is encountered in operation at high temperatures and it is very difficult to maintain the integrity of the parts, i.e., to prevent welding or fusion thereof, and to maintain conditions such that the threaded fasteners can be removed one from the other for servicing, repair and replacement. Lubricants containing organic matter are entirely inoperable at temperature even as low as 350° F.; lubricants utilizing molybdenum disulfide as the principal lubricating agent have a limited temperature range of usability, for the molybdenum disulfide, unless protected by other ingredients, will begin to change to molybdenum trioxide, a compound having no lubricating properties whatever, at about 840° F.; silver plating has also been used as a lubricant at high temperatures but begins to lose its effectiveness at 1,350° F. and is virtually worthless above 1,500° F.; graphite used heretofore in many lubricants will oxidize at temperatures in excess at approximately 1,300° F., whereby to lose the lubricating properties thereof.

Accordingly, it is an important object of the present invention to provide an improved dry film lubricant which retains its lubricating properties and serves as a parting agent to prevent metallic parts from coming in contact even after prolonged exposure at both very low and very high temperatures.

Another object of the invention is to provide a solid film lubricating composition which forms a thin uniform and continuous lubricating film on metal surfaces, which lubricating film retains its lubricating and low frictional properties even after prolonged exposures at temperatures as high as 2,000° F. and higher.

Yet another object of the invention is to provide a solid film lubricating composition incorporating therein agents more firmly to adhere the lubricating film to the underlying metal surface and particularly stainless steel metal surface used in high performance aircraft and missile structures.

Still another object of the invention is to provide an improved solid film lubricating composition of the type set forth including molybdenum disulfide as the principal lubricating agent and incorporating therein ingredients which preserve the lubricating properties of the molybdeum disulfide and resultant lubricating film even during prolonged exposure to elevated temperatures on the order of 2,000° F.

Another object of the invention is to provide a solid film lubricating composition of the type set forth which is inert to the materials including metals upon which it is applied or comes in contact, and further has good wear properties to resist the abrasive action of high temperature oxides formed on metal parts at elevated temperatures.

Yet another object of the invention is to provide an improved coating composition for application to base metals to provide thereon an improved solid film lubricant of the type set forth.

Still another object of the invention is to provide an improved method of providing a solid lubricating film on the base metals, and particularly on stainless steel metals particularly useful in high performance aircraft and missiles.

A further object of the invention is to provide a metal bearing surface having thereon a thin dry lubricating film of the type set forth, whereby the metal bearing surface retains a coating imparting lubricity thereto even after prolonged exposure of the metal bearing surface at elevated temperatures.

A still further object of the invention is to provide a metal threaded fastener having on the bearing surfaces thereof a thin dry lubricating film of the type set forth which fulfills all of the objects and advantages set forth above, the fastener having breakaway or unseating torques after exposure to elevated temperatures less than such fasteners used heretofore.

Further features of the invention pertain to the particular composition of the solid film lubricant and to the particular arrangement of the steps of the method and the arrangement of the parts whereby the above outlined and additional operating features thereof are attained.

Figure 2:
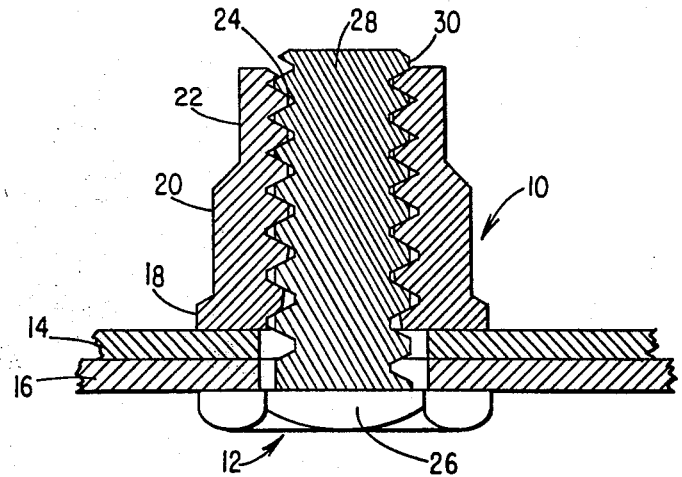

The invention, both as to its organization and method of operation, togteher with further objects and advantages thereof, will best be understood by reference to the following specification taken in connection with the accompanying drawing, in which:

FIGURE 1 is a plan view of a bolt and nut assembly having a solid lubricating film thereon made in accordance with and applied in accordance with the principles of the present inventon; and FIG. 2 is a view in vertical section through the bolt and nut assembly of FIG. 1 along the line 2—2 thereof.

It has been found that a good solid film lubricant can be provided on base metal surfaces by applying thereto a composition consisting essentially of molybdenum disulfide as the principal lubricating compound, water soluble silicate salts as the principal film forming compound, soluble phosphate salts as a first adhering agent, and a second adhering agent selected in the class consisting of water soluble boron oxide salts and water soluble chromium oxide salts. When the second adhering agent is a water soluble boron oxide salt, the cations of the salts for the film forming compound and the adhering agents are preferably essentially sodium cations; and when the second adhering agent is a chromium oxide salt, the cations of the salts for the film forming compound and the adhering agents in addition to sodium cations may comprise up to about 10 mole percent of potassium cations; hydrogen cations are also acceptable in the place of the sodium and/or potassium cations, as the case may be.

The concentration of the various components in the solid film lubricating composition must be within prescribed limits. The molybdenum disulfide comprises from about 50 mole percent to about 82 mole percent of the composition; the silicate salts comprises from about 15 mole percent to about 45 mole percent of the composition; the phosphate salts comprises from about 1.5 mole percent to about 4.5 mole percent of the composition; and the water soluble boron oxide salts or the water soluble chromium oxide salts, as the case may be, comprise from about 1.5 mole percent to about 4.5 percent of the composition. In addition, the molar ratio of the molybdenum disulfide to the sodium silicate is preferably in the range from about 1.25:1 to about 5.5:1, the molar ratio of the first adhering agent to the second adhering agent is in the range from about 0.5:1 to about 1:1, and the molar ratio of the sum of the molybdenum disulfide and the silicate salts to the sum of the adhering agents is in the range from about 10:1 to about 35:1.

The solid film lubricating composition is applied to the base metal bearing surface in accordance with the present invention from a basic aqueous solution of the ingredients, the solution preferably having a pH in the range from about 10 to about 13 and having a consistency on the order of light oil with the viscosity in the range from about 20 to about 30 centipoises. The concentration of the molybdenum disulfide in the coating composition is in the range from about 1.5 to about 10.5 moles per liter; the concentration of the silicate anions is within the range from about 0.4 to about 5.5 moles per liter; the concentration of the phosphate anions in the coating composition is from about 0.04 to about 0.55 mole per liter; the concentration of the boron oxide anions or the chromium anions, as the case may be, in the coating composition is from about 0.4 to about 0.55 mole per liter.

The coating composition is preferably applied to the base metal surface by immersing the surface in the coating composition after which the surface is removed therefrom and the excess coating composition drained therefrom and the coating dried under ambient conditions. The character of the lubricating coating is improved if it is thereafter baked at an elevated temperature in the range from about 350° F. to about 400° F. for a period for about one to about sixteen hours. If desired, additional layers of the lubricating film can be provided by repeating the coating operation. It is to be understood that the surface to be coated must be absolutely clean before applying the coating composition thereto.

There are shown in FIGS. 1 and 2 of the drawings typical metal parts on which the solid lubricant film of the present invention can be profitably applied. More specifically there is shown a nut generally designated by the numeral 10 threadedly engaging a bolt 12 and clamping together a pair of work pieces 14 and 16. The nut 10 includes a workpiece engaging section 18, a wrenching section 20 which has been illustrated as being of the 12 point type and a bolt gripping section 22, the nut 10 being internally threaded as at 24. The bolt 12 includes a head 26 having an integral shank 28 thereon provided with external threads 30 adapted to engage the internal threads 24 on the nut 10. In accordance with the present invention, the nut 10 and the bolt 12 are preferably formed of a heat and corrosion resistant steel such as A-286 which has a typical composition of 0.08% by weight of carbon, 14.75% chromium, 25.0% nickel, 1.25% molybdenum, 2.0% titanium, 020% aluminum, 0.06% boron, 0.05% zirconium, and the balance iron; other examples of such alloys on which the present invention is particularly useful are type 305, Rene 41 and Waspaloy. In accordance with the present invention, either the nut 10, or the bolt 12, or both, may have applied thereto the improved solid lubricant film, the film typically covering the entire outer surface and particularly including the threads thereon.

The following specific examples of dry lubricating films, coating compositions and coating methods illustrate the application of the present invention and it is to be understood that these examples are not intended in any way to limit the scope of the present invention.

EXAMPLE 1

A coating composition composition for providing a solid lubricant film on metals was prepared by heating 15 grams of water to an elevated temperature just below the boiling point thereof and dissolving therein 6.3 grams of sodium phosphate ($Na_3PO_4 \cdot 12H_2O$) and 6.3 grams of sodium tetraborate ($Na_2B_4O_7 \cdot 10H_2O$). After all of the sodium phosphate and sodium tetraborate was dissolved, the resultant solution was permitted to cool to ambient temperature. This solution was then added slowly with stirring to 43.7 grams of molybdenum disulfide to produce a pourable slurry. The pourable slurry at ambient temperature was then added with stirring to 43.7 grams of sodium silicate solution, 42° Bé., containing 17.5 grams of $Na_2Si_3O_7$ and 25.2 grams of water to obtain a uniform mixture which is the coating composition. The coating composition has a pH of 12 and a viscosity of 25 centipoises, whereby the coating composition has the consistency of a light oil.

A nut, such as the nut 10 illustrated in FIGS. 1 and 2 of the drawings, was provided formed of type 305 stainless steel. Any oxide on the surface of the nut 10 produced by heat treatment or the like was first loosened by boiling the nut 10 in an aqueous solution containing 30% by weight of sodium hydroxide and 9% by weight of potassium permanganate for one hour. The nut was then thoroughly rinsed and dried. Thereafter all surfaces of the nut including the threads thereof were grit blasted with 120 mesh grit for 30 minutes. It will be understood that other suitable methods may be used to remove heat treat oxide and provide a clear surface to be coated.

After the grit blasting, the nut was inspected to be sure that it was clean and dry and free of grease, oil, fingerprints, grit or other foreign matter. The nut then was placed in a porous basket which in turn was dipped into a quantity of coating composition so that the coating composition completely covered the nut, the coating composition having been well mixed and being continuously agitated while the porous basket and nut are disposed therein. When the nut was thoroughly covered, the basket with the coated nut therein was withdrawn from the coating composition and the basket well agitated while the coating on the nut was dried at the ambient conditions. After drying of the coating thereon, the nut was baked in an oven at 375° F. for 8 hours, care being taken to hold the temperature within the range 375° F. ±25° F. After baking, the coated nut was removed from the oven and cooled to ambient temperature.

The resultant lubricating film on the nut 10 was free of cracks, homogeneous and of substantially uniform thickness, the coating having a uniform black color. The lubricating film will not chip, crack or peel when scratched with the fingernail. No corrosion preventing compounds, oils, greases or supplementary lubricant coatings need be applied thereto. The nut 10 with the lubricating film thereon was then applied to a bolt, such as the bolt 12 in FIGS. 1 and 2, and tightened on the bolts against work pieces to provide bolt tension; the resultant assembly was heated for 2 hours at 800° F.; the nut 10 could still be readily removed from the bolt 12 and the lubricant film thereon exhibited a very good appearance and no cracking or breaking thereof. A nut coated as in Example 1 above was then heated at 1500° F. at a reduced pressure in the order of $10^{-4}$ to $10^{-3}$ atmosphere for 2 hours; the nut so treated could be readily removed from the associated bolt after at least five cycles of operation and same specimens after as many as twelve cycles of operation. Yet other nuts coated in accordance with Example 1 were applied to bolts 12 and tightened to torque values of 70 inch-pounds and heated at 2,000° F. for fifteen minutes at a reduced atmosphere of $10^{-4}$ to $10^{-3}$ atmosphere and still permitted disassembly and reassembly of the nut and bolt without damage to the thread of either the nut or the bolt, the unseating torques being in the range from 90 to 140 inch-pounds. The breakaway or unseating torques of the nut 10 coated in accordance with Example 1 are considerably lower than those attained with silver plated nuts tested in the neighborhood of 1,400° F. to 1,500° F., the unseating torques for silver plated nuts at 1,400° F. to 1,500° F. being 400 to 600 inch-pounds and higher, and at 2,000° F. resulting in seizure with no possibility of removing the nuts from the bolts.

The coating composition of Example 1 has the following concentrations of ingredients therein:

*Table 1*

| Ingredients | Grams | Dry basis | Percent by weight dry basis | Moles | Mole percent |
|---|---|---|---|---|---|
| $MoS_2$ | 43.7 | 43.7 | 59.2 | 0.2710 | 72.0 |
| $Na_2Si_3O_7$ | 43.7 | 17.5 | 23.7 | 0.0723 | 19.2 |
| $Na_3PO_4.12H_2O$ | 6.3 | 6.3 | 8.55 | 0.0166 | 4.4 |
| $Na_2B_4O_7.10H_2O$ | 6.3 | 6.3 | 8.55 | 0.0166 | 4.4 |
| Water | 15.0 | (41.2) | | | |

It has been found that satisfactory lubricant films are provided with a coating composition of the present invention when the concentration of the molybdenum disulfide in the composition varies in the range from about 1.5 to about 10.5 moles per liter, the preferred range being from about 2.5 to about 7.5 moles per liter. The concentration of sodium silicate in the coating composition can also be varied so long as it is in the range from about 0.4 to about 5.5 moles per liter, the preferred range being from about 0.8 to about 3.0 moles per liter. Likewise the sodium phosphate concentration can be varied within the range from about 0.04 mole per liter to about 0.55 mole per liter, the preferred range being from about 0.05 to about 0.45 mole per liter. Further, the sodium tetraborate concentration in the coating composition can also be varied within the range from about 0.04 mole per liter to about 0.55 mole per liter, the preferred range being from about 0.05 to about 0.45 mole per liter.

The concentration of the active ingredients in the dried lubricant film are expressed above in Table 1 and more specifically in the column entitled "Mole percent." It has been found that satisfactory operation and service of the lubricating film is obtained even when the concentration of the ingredients therein is varied; more specifically, the molybdenum disulfide content may vary from about 50 to about 82 mole percent; the sodium silicate content can vary from about 15 to about 45 mole percent; the sodium phosphate content can vary from about 1.5 to about 4.5 mole percent; and the sodium tetraborate content can vary from about 1.5 to about 4.5 mole percent.

In the lubricating film formed according to Example 1, above the sodium silicate is the principal film former and provides a continuous and coherent film over the entire surface of the metal part coated. The molybdenum disulfide is the principal lubricant and is uniformly distributed throughout the sodium silicate film, and further prevents the coating from becoming glassy. The sodium silicate further performs a secondary function in protecting the chemical integrity of the molybdenum disulfide at elevated temperatures. The sodium phosphate serves primarily as an adhering agent to bind the lubricating film to the underlying metal surface, this function being particularly important when the lubricating film is applied to stainless steel surfaces containing substantial quantities of chromium; the phosphate further provides a secondary function of protecting the chemical integrity of the molybdenum disulfide at elevated temperatures, thus to preserve the lubricating properties thereof. The sodium borate also serves as an adhering agent to bind the lubricating film to the underlying metal surface, and as a secondary function assists in protecting the chemical integrity of the molybdenum disulfide at elevated temperatures to preserve lubricating properties thereof.

It further has been found that the ratio among the ingredients in the coating composition, and therefore the ratio among the ingredients in the lubricating film formed therefrom, is important and critical. In Example 1, the molar ratio of the molybdenum disulfide to the sodium silicate is about 3.75:1; in order to provide a satisfactory lubricant film, it has been found that this ratio between the molybdenum disulfide and the sodium silicate must be in the range from about 1.25:1 to about 5.5:1. Likewise, the molar ratio of the sodium phosphate to the sodium tetraborate in the coating composition and the resultant lubricant film is critical, the ratio in Example 1 being 1:1; satisfactory lubricant films are provided when this ratio is in the range from about 0.5:1 to about 1:1. Furthermore, the ratio of the principal film forming ingredients, namely, the molybdenum disulfide plus the sodium silicate, to the adhering ingredients, namely, the sodium phosphate and the sodium tetraborate, is critical and in Example 1 is about 10.4:1; this ratio is preferably in the range from about 10:1 to about 35:1.

The amount of water in the coating composition can be varied as pointed out above so as to vary the molar concentration of the film forming ingredients therein, it being understood that the less viscous coating compositions tend to provide thinner lubricating films upon the coated metal parts, and conversely, more viscous coating compositions tend to form thicker lubricating films upon the coated metal parts. It further has been found that it is possible to provide a first coating upon a metal part, and after the baking operation to apply a second coating thereto which increases the thickness of the lubricating film. For the purposes of economy, it is preferred that only one or the most two coating operations be carried out on each part and, accordingly, it is preferred that the coating composition have a viscosity of the order of a light oil or about 20 to 30 centipoises. As pointed out above, the pH of the coating composition of Example 1 is about pH 12; the pH of suitable compositions may be as low as 10 or as high as 13 depending upon the chemical composition thereof.

When the principal ingredients are those set forth in Example 1 above, namely, molybdenum disulfide, silicate ion, phosphate ion and anion formed from an oxide of boron, it has been found that the cation must be sodium. More specifically, the cation must form water soluble salts at the pH encountered and, accordingly, many of the common cations are eliminated from consideration. The potassium cations form soluble coating compositions, but the lubricating films formed therefrom are not uniform, free of cracks and adherent. Accordingly, it has been found that the cations of the silicate, the phosphate and the borate must be essentially only sodium cations.

The following are other examples of suitable formulations made in accordance with the principles of the present invention to further illustrate the variations in the coating composition which will provide satisfactory lubricating films.

EXAMPLE 2

The following proportions of ingredients were mixed in accordance with the procedure of Example 1 above to provide a coating composition:

| Ingredients | Grams | Dry basis | Percent by weight dry basis | Moles | Mole percent |
|---|---|---|---|---|---|
| $MoS_2$ | 45 | 45 | 62.5 | 0.280 | 74.1 |
| $Na_2Si_3O_7$ | 45 | 18 | 25.0 | 0.074 | 19.6 |
| $Na_3PO_4.12H_2O$ | 4.5 | 4.5 | 6.25 | 0.012 | 3.15 |
| $NaB_4O_7.10H_2O$ | 4.5 | 4.5 | 6.25 | 0.012 | 3.15 |
| Water | 15 | (42) | | | |

Nuts such as the nut 10 in FIGS. 1 and 2 were coated with the coating composition of Example 2 in accordance to the method described above with respect to Example 1. The coated nuts were found to have a continuous, coherent and crack-free film thereon which provided lubrication therefor even at elevated temperatures and after repeated cycles of operation at elevated temperatures, whereby the lubricating film provided had all of the advantages set forth above with respect to Example 1.

The ratio of the molybdenum disulfide to the sodium silicate in Example 2 is 3.78:1; the ratio of the phosphate to the borate is 1:1; the ratio of the principal film forming ingredients, namely, the molybdenum disulfide plus the sodium silicate, to the adhering agents, namely, the phosphate and the borate, is about 14.9:1. It will be seen therefore that there is a lesser amount of the adhering agents relative to the film forming agents in Example 2 as compared to Example 1.

EXAMPLE 3

The following ingredients were mixed in the proportions set forth in accordance with the procedure of Example 1 above:

| Ingredients | Grams | Dry basis | Percent by weight dry basis | Moles | Mole percent |
|---|---|---|---|---|---|
| $MoS_2$ | 22.7 | 22.7 | 58.5 | 0.141 | 69.2 |
| $Na_2Si_3O_7$ | 33.7 | 13.5 | 34.8 | 0.056 | 27.5 |
| $Na_3PO_4.12H_2O$ | 1.3 | 1.3 | 3.35 | 0.0034 | 1.65 |
| $Na_2B_4O_7.10H_2O$ | 1.3 | 1.3 | 3.35 | 0.0034 | 1.65 |
| Water | 41 | (61.2) | | | |

Nuts such as the nut 10 of FIGS. 1 and 2 were coated using the coating method of Example 1 to apply a lubricating film thereto using the composition of Example 3 above. The lubricating film thus formed was continuous, crack-free and provided good lubrication after heating to elevated temperatures and after repeated cycles of heating to elevated temperatures, whereby the lubricating film provided had all of the desirable characteristics set forth above with respect to Example 1.

In Example 3, the ratio of molybdenum disulfide to the sodium silicate is about 2.52:1, whereby this composition has relatively more sodium silicate and relatively less molybdenum disulfide as compared to the coating composition of Examples 1 and 2 above. The ratio between the phosphate and the borate is again 1:1. The ratio of the principal film forming agents, namely, the molybdenum disulfide and the sodium silicate, to the adhering agents, namely, the phosphate and the borate, is about 29.3:1, whereby there is substantially less adhering agent in the coating composition of Example 3 as compared to the coating compositions of either Example 1 or Example 2 above. Furthermore, the water content of Example 3 is substantially higher than that of the Examples 1 and 2 to provide a less viscous coating composition.

EXAMPLE 4

The following ingredients were mixed in the concentrations shown using the procedure described above with respect to Example 1:

| Ingredients | Grams | Dry basis | Percent by weight dry basis | Moles | Mole percent |
|---|---|---|---|---|---|
| $MoS_2$ | 45.0 | 45.0 | 61.7 | 0.280 | 73.6 |
| $Na_2Si_3O_7$ | 45.0 | 18.0 | 24.7 | 0.074 | 19.5 |
| $Na_3PO_4.12H_2O$ | 3.5 | 3.5 | 4.8 | 0.0092 | 2.4 |
| $Na_2B_4O_7.10H_2O$ | 6.5 | 6.5 | | | |
| Water | 15 | (42) | | | |

Nuts such as the nut 10 of FIGS. 1 and 2 were coated with the coating composition of Example 4 utilizing the coating method of Example 1. The resultant coated nuts had a lubricant film thereon which was continuous, uniform, coherent and crack-free; the lubricant film provided lubrication between the nuts and an associated bolt even at elevated temperatures and after repeated application and removal of the nuts at elevated temperatures, whereby the lubricating film possessed all of the advantages described above with respect to the nuts coated using the coating composition of Example 1.

In the coating composition of Example 4, the molar ratio of the molybdenum disulfide to the sodium silicate was about 3.77:1. However, the ratio of the phosphate to the borate was about 0.53:1, whereby the ratio was substantially less than that of Examples 1 to 3 above. The ratio of the principal film forming ingredients, namely, molybdenum disulfide and the sodium silicate, to the adhering agents, namely, the phosphate and the borate, was about 13.5:1.

EXAMPLE 5

The following ingredients were mixed in the proportions specified using the method of Example 1, the chromate being substituted for the tetraborate in the procedure:

| Ingredients | Grams | Dry basis | Percent by weight dry basis | Moles | Mole percent |
|---|---|---|---|---|---|
| $MoS_2$ | 44 | 44 | 63.5 | 0.273 | 73.2 |
| $Na_2Si_3O_7$ | 44 | 17.6 | 25.4 | 0.073 | 19.6 |
| $Na_3PO_4.12H_2O$ | 3.5 | 3.5 | 5.0 | 0.009 | 2.4 |
| $Na_2CrO_4.4H_2O$ | 4.23 | 4.23 | 6.1 | 0.018 | 4.8 |
| Water | 15 | | | | |

Nuts such as the nut 10 of FIGS. 1 and 2 were coated with the coating composition of Example 5 utilizing the coating method of Example 1 to provide dry lubricant films thereon. The lubricant films so formed were smooth, uniform, continuous, crack-free and tightly adherent to the underlying metal surface. The nuts were well lubricated and retained their good operating characteristics even at elevated temperatures and after repeated cycles of reuse at elevated temperatures, whereby the coated nuts had all of the desirable characteristics of the coated nuts discussed above with regard to Example 1.

In Example 5, the ratio of the molybdenum disulfide to the sodium silicate is about 3.73:1; the ratio of the phosphate to the chromate is about 0.5:1; and the ratio of the principal film forming ingredients, namely, the molybdenum disulfide and the sodium silicate, to the adhering agents, namely, the phosphate and the chromate, is about 12.9:1.

It further has been found that when the second adhering agent is chromate as in Example 5 rather than the borate as in Example 1 to 4, the coating composition will tolerate a certain amount of potassium cations for the silicate and phosphate and chromate anions, and up to as much as 10 mole percent of the cations for these three anions may be potassium rather than sodium. The following is a specific example of a satisfactory coating composition made in accordance with the present invention and including potassium cations therein:

EXAMPLE 6

| Ingredients | Grams | Dry basis | Percent by weight dry basis | Moles | Mole percent |
|---|---|---|---|---|---|
| $MoS_2$ | 44 | 44 | 64.1 | 0.273 | 73.2 |
| $Na_2Si_3O_7$ | 44 | 17.6 | 25.7 | 0.073 | 19.6 |
| $Na_3PO_4.12H_2O$ | 3.5 | 3.5 | 5.1 | 0.009 | 2.4 |
| $K_2CrO_4$ | 3.5 | 3.5 | 5.1 | 0.018 | 4.8 |
| Water | 15 | (41.4) | | | |

Stainless steel nuts such as the nut 10 of FIGS. 1 and 2 were coated with the coating composition of Example 6 by means of the coating method of Example 1 to provide thereon a tightly adherent continuous and crack-free, lubricant film. The lubricant film retained its chemical integrity and provided lubrication for the nuts even at elevated temperatures and after a series of cycles of operation at the elevated temperatures.

The molar ratios among the four ingredients of Example 6 are the same as those for example as Example 5 but it is noted that potassium cation is substituted as the cation for the chromate ion whereby the coating composition of Example 6 contains about 4.8 mole percent of potassium cation therein as does the lubricant film formed therefrom.

It will be seen that there have been provided improved dry film lubricants, methods of applying such lubricants, and threaded fasteners carrying such lubricants which fulfill all of the objects and advantages set forth above. More specifically, an improved dry film lubricant has been provided which serves as a parting agent to keep adjacent metallic surfaces from coming into contact with each other, the lubricant having low frictional characteristics and having good wear properties to resist the abrasive action of high temperature oxides formed on metal surfaces after exposure at elevated temperatures; the lubricant is inert to the metal surface upon which it is applied or with which it comes in contact. There further has been provided a solid film lubricating composition which forms a thin uniform and continuous lubricating film on metal surfaces, the film retaining its lubricating properties even at prolonged exposures at temperatures as high as 2,000° F. and higher. There also has been provided an improved method of providing a solid lubricating film on base metals and particularly on stainless steel metals particularly useful in high performance aircraft and missiles. There further has been provided a metal threaded fastener having on the bearing surface thereof a thin dry lubricating film, the fastener having breakaway or unseating torques after exposure to elevated temperatures that are less than the fasteners provided heretofore.

While there has been described what are at present considered to be certain preferred embodiments of the invention, it will be understood that various modifications may be made therein, and it is intended to cover in the appended claims all such modifications as fall within the true spirit and scope of the invention.

What is claimed is:

1. A solid film lubricating composition consisting essentially of from about 50 mole percent to about 82 mole percent of molybdenum disulfide as the principal lubricating compound, from about 15 mole percent to about 45 mole percent of water soluble silicate salts as the principal film forming compound, from about 1.5 mole percent to about 4.5 mole percent of water soluble phosphate salts as a first adhering agent, and from about 1.5 mole percent to about 4.5 percent of a second adhering agent selected from the class consisting of water soluble boron oxide salts and water soluble chromium oxide salts, the cations of the salts for said film forming compound and said adhering agents consisting essentially of sodium cations when said second adhering agent is said water soluble boron oxide salts and the cations of the salts for said film forming compound and said adhering agents consisting essentially of sodium cation and up to about 10 mole percent potassium cations when said second adhering agent is said water soluble chromium oxide salts.

2. The solid film lubricating composition set forth in claim 1, wherein said second adhering agent is a water soluble borate salt.

3. The solid film lubricating composition set forth in claim 1, wherein, said second adhering agent is a water soluble chromate salt.

4. A solid film lubricating composition consisting essentially of from about 50 mole percent to about 82 mole percent of molybdenum disulfide as the principal lubricating compound, from about 15 mole percent to about 45 mole percent of sodium silicate as the principal film forming compound, the molar ratio of the molybdenum disulfide to the sodium silicate being in the range from about 1.25:1 to about 5.5:1, from about 1.5 mole percent to about 4.5 mole percent of trisodium phosphate as a first adhering agent, and from about 1.5 mole percent to about 4.5 mole percent of the sodium salt of boron oxide as a second adhering agent.

5. A solid film lubricating composition consisting essentially of from about 50 mole percent to about 82 mole percent of molybdenum disulfide as the principal lubricating compound, from about 15 mole percent to about 45 mole percent of sodium silicate as the principal film forming compound, from about 1.5 mole percent to about 4.5 mole percent of trisodium phosphate as a first adhering agent, and from about 1.5 mole percent to about 4.5 mole percent of the sodium salt of boron oxide as a second adhering agent, the molar ratio of said trisodium phosphate to said sodium salt of boron oxide being in the range from about 0.5:1 to about 1:1.

6. A solid film lubricating composition consisting essentially of from about 50 mole percent to about 82 mole percent of molybdenum disulfide as the principal lubricating compound, from about 15 mole percent to about 45 mole percent of sodium silicate as the principal film forming compound, from about 1.5 mole percent to about 4.5 mole percent of trisodium phosphate as a first adhering agent, and from about 1.5 mole percent to about 4.5 mole percent of the sodium salt of boron oxide as a second adhering agent, the molar ratio of the sum of said molybdenum disulfide and said sodium silicate to the sum of said adhering agents being in the range from about 10:1 to about 35:1.

7. A solid film lubricating composition consisting essentially of from about 50 mole percent to about 82 mole percent of molybdenum disulfide as the principal lubricating compound, from about 15 mole percent to about 45 mole percent of sodium silicate as the principal film forming compound, the molar ratio of said molybdenum disulfide to said sodium silicate being in the range from about 1:25:1 to about 5.5:1, from about 1.5 mole percent to about 4.5 mole percent of trisodium phosphate as a first adhering agent, and from about 1.5 mole percent to about 4.5 mole percent of the sodium salt of boron oxide as a second adhering agent, the molar ratio of said trisodium phosphate to said sodium salt of boron oxide being in the range from about 0.5:1 to about 1:1, the molar ratio of the sum of said molybdenum disulfide and said sodium silicate to the sum of said adhering agents being in the range from about 10:1 to about 35:1.

8. A coating composition to provide a solid film lubricant on base metals consisting essentially of an aqueous solution having a pH in the range from about 10 to about 13 and containing from about 1.5 to about 10.5 moles per liter of molybdenum disulfide as the principal lubricating agent, from about 0.4 to about 5.5 moles per liter of water soluble silicate anions as the principal film forming agent, from about 0.04 to about 0.55 mole per liter of water soluble phosphate anions as a first adhering agent, and from about 0.4 to about 0.5 mole per liter of a second adhering agent selected for the class consisting of water soluble boron oxide anions and water soluble chromium oxide anions, the cations of said film forming agent and said adhering agents consisting essentially of hydrogen cations and sodium cations when said second adhering agent is said water soluble boron oxide salts and the cations for said film forming agent and said adhering agents consisting essentially of hydrogen cations and sodium cations and up to about 10 mole percent potassium cations when said second adhering agent is said water soluble chromium oxide salts.

9. A coating composition to provide a solid film lubricant on base metals consisting essentially of an aqueous solution having a pH in the range from about 10 to about 13 and containing from about 1.5 to about 10.5 moles per liter of molybdenum disulfide as the principal lubricating agent, from about 0.04 to about 5.5 moles per liter of water soluble silicate anions as the principal film forming agent, from about 0.04 to about 0.55 mole per liter of water soluble phosphate anions as a first adhering agent, and from about 0.04 to about 0.55 mole per liter of water soluble boron oxide anions as a second adhering agent, the cations of said film forming compound and said adhering agents consisting essentially of hydrogen cations and sodium cations.

10. A coating composition to provide a solid film lubricant on base metals consisting essentially of an aqueous solution having a pH in the range from about 10 to about 13 and containing from about 1.5 to about 10.5 moles per liter of molybdenum disulfide as the principal lubricating agent, from about 0.04 to about 5.5 moles per liter of water soluble silicate anions as the principal film forming agent, the molar ratio of the molybdenum disulfide to the silicate anions being in the range from about 1.25:1 to about 5.5:1, from about 0.04 to about 0.55 mole per liter of water soluble phosphate anions as a first adhering agent, and from about 0.04 to about 0.55 mole per liter of water soluble boron oxide anions as a second adhering agent, the cations of said film forming compound and said adhering agents consisting essentially of hydrogen cations and sodium cations.

11. A coating composition to provide a solid film lubricant on base metals consisting essentially of an aqueous solution having a pH in the range from about 10 to about 13 and containing from about 1.5 to about 10.5 moles per liter of molybdenum disulfide as the principal lubricating agent, from about 0.04 to about 5.5 moles per liter of water soluble silicate anions as the principal film forming agent, from about 0.04 to about 0.55 mole per liter of water soluble phosphate anions as a first adhering agent, and from about 0.04 to about 0.55 mole per liter of water soluble boron oxide anions as a second adhering agent, the cations of said film forming compound and said adhering agents consisting essentially of hydrogen cations and sodium cations, the molar ratio of said phosphate anions to said boron oxide anions being in the range from about 0.5:1 to about 1:1.

12. A coating composition to provide a solid film lubricant on base metals consisting essentially of an aqueous solution having a pH in the range from about 10 to about 13 and containing from about 1.5 to about 10.5 moles per liter of molybdenum disulfide as the principal lubricating agent, from about 0.4 to about 5.5 moles per liter of water soluble silicate anions as the principal film forming agent, from about 0.04 to about 0.55 mole per liter of water soluble phosphate anions as a first adhering agent, and from about 0.04 to about 0.55 mole per liter of water soluble boron oxide anions as a second adhering agent, the cations of said film forming compound and said adhering agents consisting essentially of hydrogen cations and sodium cations, the molar ratio of the sum of said molybdenum disulfide and said silicate ions to the sum of said adhering agents being in the range from about 10:1 to about 35:1.

13. A coating composition to provide a solid film lubricant on base metals consisting essentially of an aqueous solution having a pH in the range from about 10 to about 13 and containing from about 1.5 to about 10.5 moles per liter of molybdenum disulfide as the principal lubricating agent, from about 0.04 to about 5.5 moles per liter of water soluble silicate anions as the principal film forming agent, the molar ratio of the molybdenum disulfide to the silicate anions being in the range from about 1.25:1 to about 5.5:1, from about 0.04 to about 0.55 mole per liter of water soluble phosphate anions as a first adhering agent, and from about 0.04 to about 0.55 mole per liter of water soluble boron oxide anions as a second adhering agent, the cations of said film forming compound and said adhering agents consisting essentially of hydrogen cations and sodium cations, the molar ratio of said phosphate anions to said boron oxide anions being in the range from about 0.5:1 to about 1:1, the molar ratio of the sum of said molybdenum disulfide and said silicate ions to the sum of said adhering agents being in the range from about 10:1 to about 35:1.

14. A coating composition to provide a solid film lubricant on base metals consisting essentially of an aqueous solution having a pH in the range from about 10 to about 13 and containing from about 2.5 to about 7.5 moles per liter of molybdenum disulfide, from about 0.8 to about 3.0 moles per liter of water soluble silicate anions, from about 0.05 to about 0.45 mole per liter of water soluble phosphate anions as a first adhering agent, and from about 0.5 to about 0.45 mole per liter of water soluble boron oxide anions as a second adhering agent, the cations of said film forming compound and said adhering agents consisting essentially of hydrogen cations and sodium cations.

References Cited by the Examiner

UNITED STATES PATENTS

| | | | |
|---|---|---|---|
| 2,711,974 | 6/1955 | Happe | 117—135.1 |
| 2,998,328 | 8/1961 | Munger et al. | 106—84 X |
| 3,079,204 | 2/1963 | Lamson et al. | 252—28 |

OTHER REFERENCES

"$MoS_2$ Lubricants: The Many Forms," in Lubrication Engineering, February 1963, page 88.

DANIEL E. WYMAN, *Primary Examiner.*

I. VAUGHN, *Assistant Examiner.*